(12) United States Patent
Hill

(10) Patent No.: US 11,026,404 B2
(45) Date of Patent: Jun. 8, 2021

(54) PET IDENTIFICATION TAG WITH AN INTEGRATED RELEASABLE COUPLING

(71) Applicant: Robert Hill, Bolton, MA (US)

(72) Inventor: Robert Hill, Bolton, MA (US)

( * ) Notice: Subject to any disclaimer, the term of this patent is extended or adjusted under 35 U.S.C. 154(b) by 372 days.

(21) Appl. No.: 16/151,894

(22) Filed: Oct. 4, 2018

(65) Prior Publication Data

US 2019/0104708 A1    Apr. 11, 2019

Related U.S. Application Data

(60) Provisional application No. 62/568,431, filed on Oct. 5, 2017.

(51) Int. Cl.
*A01K 27/00* (2006.01)
*A01K 11/00* (2006.01)

(52) U.S. Cl.
CPC ............ *A01K 27/006* (2013.01); *A01K 11/00* (2013.01); *A01K 27/001* (2013.01)

(58) Field of Classification Search
CPC ...... A01K 11/00; A01K 27/00; A01K 27/001; A01K 27/008; G09F 3/00; A44B 15/002
USPC ......... 119/858, 863; 40/300, 1.5; 24/3.1, 3.6
See application file for complete search history.

(56) References Cited

U.S. PATENT DOCUMENTS

| | | | | |
|---|---|---|---|---|
| 4,259,798 A * | 4/1981 | McConnell | ............ | A01K 11/00 40/300 |
| 4,325,273 A * | 4/1982 | Gibbons | ............... | A44B 15/007 70/456 R |
| 5,429,393 A * | 7/1995 | Parlo | ...................... | B42D 15/00 283/75 |
| 5,615,454 A * | 4/1997 | Contarino | ............... | A45C 13/20 24/116 A |
| 6,334,239 B1 * | 1/2002 | Kraut | .................... | A44B 15/002 24/3.1 |
| 6,435,340 B1 * | 8/2002 | Bowes, Jr. | ............. | A45C 11/32 206/37.1 |
| 6,530,131 B1 * | 3/2003 | Hopkins | .................. | A45F 5/00 24/3.13 |
| 6,685,338 B1 * | 2/2004 | Lewis | .................... | F21V 33/008 362/103 |
| 7,305,782 B2 * | 12/2007 | Olsen | ........................ | G09F 3/14 119/858 |
| 7,350,385 B1 * | 4/2008 | Book | .................... | A44B 15/005 206/37.5 |
| 7,861,443 B2 * | 1/2011 | Hill | ......................... | G09F 3/207 40/300 |
| 8,413,357 B1 * | 4/2013 | Hagen | ....................... | G09F 3/00 40/300 |
| 8,807,443 B2 * | 8/2014 | Kennett | ............... | A01K 29/005 235/494 |
| 9,027,515 B2 * | 5/2015 | Fidrych | ................... | A45F 3/047 119/858 |
| 9,911,368 B2 * | 3/2018 | Blizzard | ................. | G09F 3/185 |
| 10,354,562 B2 * | 7/2019 | Walker | .................... | G09F 3/201 |
| 2003/0033737 A1 * | 2/2003 | Bradshaw | ................. | G09F 3/14 40/300 |

* cited by examiner

*Primary Examiner* — Yvonne R Abbott-Lewis
(74) *Attorney, Agent, or Firm* — Brian M. Dingman; Dingman IP Law, PC

(57) ABSTRACT

A pet identification tag in which the tag body is adapted to include an integrated attachment ring that can be releasable coupled to a pet collar in a secure and convenient fashion without the need for a separate intermediate coupling device.

18 Claims, 2 Drawing Sheets

PET IDENTIFICATION TAG WITH AN INTEGRATED RELEASABLE COUPLING

CROSS-REFERENCE TO RELATED APPLICATION

This application claims priority of provisional application 62/568,431 filed on Oct. 5, 2017.

FIELD

The present disclosure relates to an identification tag of the type that is typically used for pet identification.

BACKGROUND

It is estimated that over 60% of U.S. households own a pet, which equates to almost 80 million homes. Over 97 million of these pets are either dogs or cats and it is commonplace for pet owners to provide some form of identification that can be worn by their pets to facilitate their safe return in case they are lost or somehow separated from their owners.

The vast majority of pet identification tags in use today include a hole or a fixed loop on the body of the tag for use in attaching the tag to the animal's collar by means of a separate metal split ring or metal S-hook. While functional, the need for a secondary coupling device can be an inconvenience and causes the tag body to dangle further from the animal's neck than esthetically desirable, as this hardware interface effectively adds length to the tag attachment point.

The use of a split ring or S-hook as a coupling device on a typical collar attachment D-ring in combination with a tag that has a front to rear attachment opening causes the dangling tag to rest in a natural side to side orientation when worn by the animal verses a more practical and visually appealing front to back tag orientation.

SUMMARY

This disclosure features a pet identification tag with a unique structure for attachment to a pet collar. The pet identification tag provides distinct advantages. An integrated attachment structure provides user convenience in its releasable coupling to the pet's collar, therefore eliminating the need for a secondary coupling device such as a split ring or S-hook.

The disclosure may be accomplished with a generally flat tag body that is made of metal, elastomer, plastic, wood or other moldable or 3D printable material which allows customer specified pet identification information to be machine marked on or into the generally flat tag surfaces. In an embodiment of the tag, the tag body is molded over a helically wound oblong ring, or the ring is otherwise permanently anchored during manufacture such that the end points of the ring are exposed outside of the tag body and allow the ring to be releasably attached to a pet collar D-ring. This is accomplished by means of two opposing and partially overlapping curved arm sections comprising the exposed portion of a helical ring that forms a closed and generally circular capture space in which the collar attachment D-ring is held. Due to the spring-like characteristics of the helical ring, the arm section end points can be laterally spread apart from one another, allowing the collar D-ring to be wedged by hand between the spread ring sections from either side and then moved along their exposed overlapping length until captured within its closed area, thus providing a reliable coupling between the subject pet tag and the pet collar. Release of the pet tag is accomplished in a similar manner, spreading the arm section endpoints in a lateral fashion and then threading the collar D-ring in between the adjacent ring sections and along their overlapping length until free from the capture area, thus detaching the pet tag from the pet collar.

The attachment arm orientation within the tag body places the front of the pet identification tag and associated information in a more desirable forward-facing position on the animal. Further, this tag attachment design eliminates the need for an intermediate split ring or S-hook, allowing the tag body to sit closer to the pet collar for improved appearance.

The overlapping arm sections that are external to the tag body form a rounded shape that provides sufficient pull strength at the long radius of the partially encased helically wound ring for reliable pet collar D-ring attachment, and sufficient lateral deflection of the overlapping ring sections tangent to the radius to allow the opposing ring sections to be easily spread apart in a spring-like manner for manual attachment or detachment from the collar D-ring.

In one aspect, a pet identification tag that is adapted to be releasably coupled directly to a pet collar attachment loop includes a tag body and an attachment ring partially encased in the tag body, the attachment ring having two ring endpoints external to the tag body and that partially overlap one another along lengths thereof to form a fully enclosed coupling area immediately adjacent to the tag body, where the ring endpoints are configured to be spread apart laterally to accommodate insertion of the pet collar attachment loop between them and along their overlapping lengths to either couple or decouple the pet collar attachment loop.

The coupling area may be generally circular. The coupling area may have two ends and may be bounded on the two ends by first and second arc-shaped structures. The first arc-shaped structure may comprise the ring endpoints, and the second arc-shaped structure may comprise a perimeter of the tag body. The ring endpoints may comprise overlapping arms. The arms may be curved along lengths thereof. The ring endpoints may be made from a spring material, such that they can be spread apart from one another from their rest positions and will return to their rest positions.

The attachment ring may be a one-piece unitary structure. The attachment ring may be oblong-shaped. The attachment ring may comprise two overlapping curved arms that are external to the body and with spaced ends. The arms may be configured such that one arm end can be moved away from the other arm to create a space into which the pet collar attachment loop can be inserted. The arms may be further configured such that the pet collar attachment loop can be moved along the space until it enters the coupling area.

The attachment ring may comprise separate ring portions, each ring portion comprising a curved arm that is external to the tag body, wherein the arms partially overlap. Each ring portion may further comprise an integral component that is embedded in the tag body.

In another aspect, a pet identification tag that is adapted to be releasably coupled directly to a pet collar attachment loop includes a tag body and an attachment ring partially encased in the tag body, the attachment ring having two overlapping arms that are curved along lengths thereof and are external to the tag body and that partially overlap one another to form a fully enclosed coupling area immediately adjacent to the tag body, where the arms are made from a spring material and are configured to be spread apart laterally from their rest positions to accommodate insertion of the pet collar attachment loop between them and along their overlapping lengths, and wherein the arms are further configured to return to their rest positions when the pet collar attachment loop is no longer between them. The coupling area is generally circular and has two ends and is bounded on the two ends by first and second arc-shaped structures, wherein the first arc-shaped structure comprises the overlapping arms and the second arc-shaped structure comprises a perimeter of the tag body. The attachment ring may be a one-piece unitary structure. The attachment ring may be oblong-shaped.

BRIEF DESCRIPTION OF THE DRAWINGS

Various other objects, features and advantages of the present invention will become fully appreciated as the invention becomes better understood when considered in conjunction with the accompanying drawings, in which reference characters designate the component parts and functional areas throughout the several views, and wherein.

DETAILED DESCRIPTION

Figure 3:
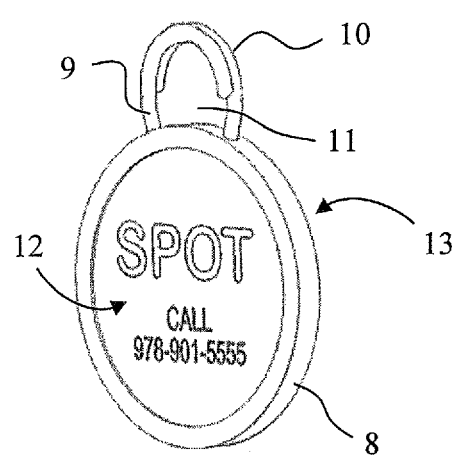
FIG. 3 shows an embodiment of the subject pet tag body 8 with a releasable coupling formed by a pair of laterally opposed and overlapping arms 9 and 10.
Figure 4:
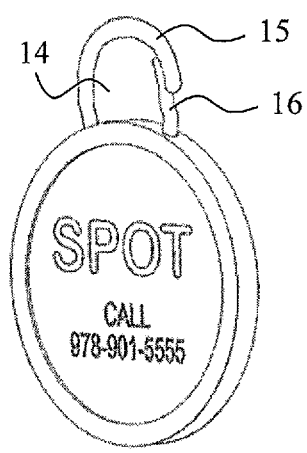
FIG. 4 shows an embodiment of the subject pet tag where the coupling area 14 is formed by a pair of vertically opposed and overlapping arms 15 and 16.
Figure 5:
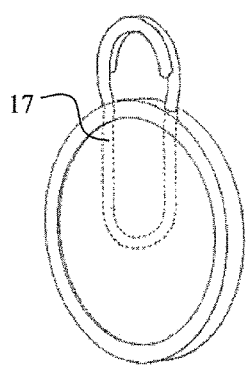
FIG. 5 shows an embodiment of the subject pet tag where the encased and non-visible portion of the attachment component 17 is helically wound in an oblong circular shape.
Figure 6:
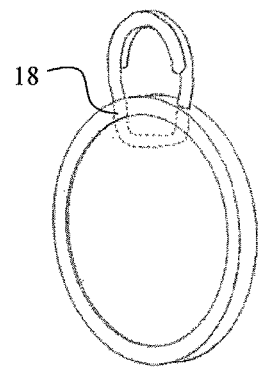
FIG. 6 shows an embodiment of the subject pet tag where the encased and non-visible portion of the attachment component 18 is helically wound in an example of an alternate shape.
Figure 7:
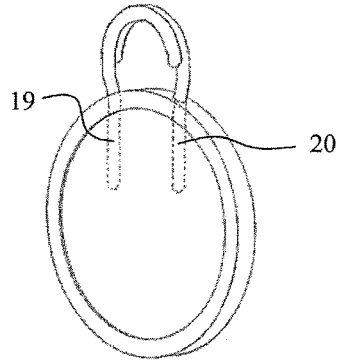
FIG. 7 shows an embodiment of the subject pet tag where the encased and non-visible portions of the two attachment components 19 and 20 are individually anchored.

The components of an embodiment of the pet tag, shown in FIG. 3, include an identification tag body 8 which is molded, punched, cut, 3D printed or otherwise formed from a machine markable elastomeric, wood, plastic or metal material, with integrated attachment arms 9 and 10, front-facing identification surface 12 and rear-facing identification surface 13. Design features of the pet tag include the following: The tag body 8 is molded, 3D printed or otherwise attached to the attachment ring arm sections 9 and 10 during manufacture, incorporating these opposing arm sections as in integral component of the pet tag device. This attachment ring component is manufactured from metal or a functionally similar material such as but not limited to steel, stainless steel, nickel, brass, titanium, magnesium, metal alloy, plastic, nylon, or composites, where bendable metal ring components are machine formed (on a metal wire forming machine for example) and non-metal ring components are molded (injection molding for example) or 3D printed. The tag body can be made of any type of material, including but not limited to metal, plastic, wood and silicone rubber where the attachment ring component is permanently placed within the tag body via insert molding, press insertion or 3D printing Alternative or Additional Embodiments of the Pet Tag:

The tag body may be manufactured in a variety of basic geometric or novelty shapes, various colors or color combinations and materials variations. Referencing FIG. 3, the external capture area 11 may be varied in length, width, and shape. The attachment arms 9 and 10 may be made of either metal of functionally similar non-metal materials and may vary in diameter, hardness, strength, finish, profile, circular geometry and any other functional or aesthetic characteristics. The overlapping arm sections 9 and 10 may be laterally opposed to one another as in the embodiment of FIG. 3, or vertically opposed where overlapping one another as shown in FIG. 4. As illustrated by example in FIG. 5, FIG. 6 and FIG. 7, the encased, non-visible section of the overlapping attachment arms may be of any open or closed loop design and dimension such that the encased portion of the attachment arms anchors the releasable coupling within the tag body.

The Pet Tag Can Be Used In the Following Manner.

Figure 8:
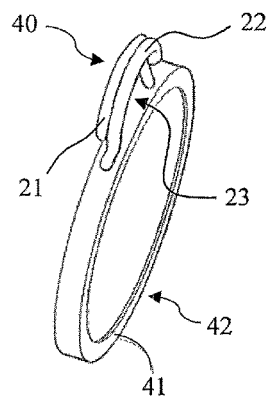
FIG. 8 shows an example of the subject device unattached to the pet collar, where the external sections 21 and 22 of the helically wound ring overlap with one another to enclose the attachment area 23.
Figure 9:
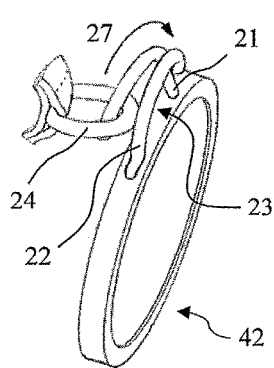
FIG. 9 shows an attachment example of the subject device, where the pet collar D-ring 24 is used to wedge open and laterally spread apart the external overlapping ring sections 21 and 22 as it is moved by hand along the length 27 of the adjacent rings 21 and 22 until it falls inside the capture area 23, allowing the arms to then spring back to their rest position next to one another.
Figure 10:
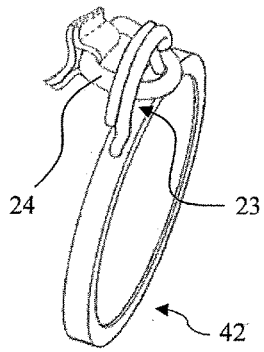
FIG. 10 shows an attachment example of the subject device, where the pet collar D-ring 24 is fully inserted and held within the capture area 23 and ready for use.
Figure 11:
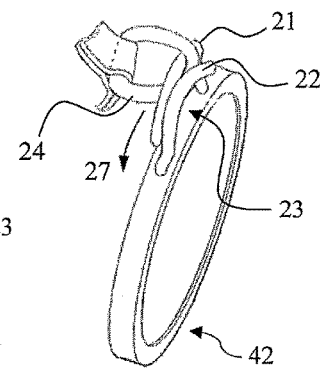
FIG. 11 shows the detachment function, where the pet collar D-ring 24 is used to wedge open and laterally spread apart the external overlapping ring sections 21 and 22 as it is moved by hand along the length 27 of the adjacent rings 21 and 22 until it is freed from the capture area 27.

As illustrated in FIG. 8, pet tag 42 includes integrated attachment component 40 that comprises two adjacent and overlapping arm sections 21 and 22 that together and in combination with the tag body 41 form an enclosed capture area 23. As illustrated in FIG. 9, the spring-like material used for the attachment arms allows the two opposing arm sections 21 and 22 to be laterally spread apart from one another with one's fingers, a suitable prying tool or the pet collar attachment D-ring 24, whereas the pet collar attachment D-ring 24 can then be guided by hand between either end of the two arm sections 21 or 22 and then guided by hand along the deflected overlapping length of the first arm section 27 until it passes the end point of the second overlapping arm section and into the enclosed capture area 23, at which point the opposing arm sections spring back to their natural rest position next to one another. Shown in FIG. 10. with the pet collar attachment D-ring 24 fully enclosed within the capture area 23, the pet identification tag device 42 is mounted and ready for use. Removal is easily accomplished by reversing the procedure stated above as illustrated in FIG. 11, spreading the opposing arm sections 21 and 22 apart and then guiding the pet collar attachment D-ring 24 by hand in between either arm section's end point and along the overlapping length of the external ring sections 27 until freed outwardly from the capture area 23.

Figure 2:
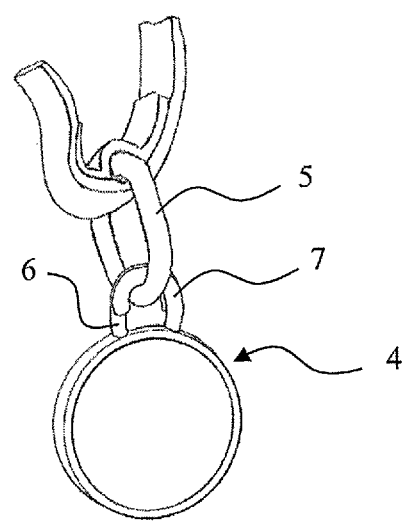
FIG. 2 shows an embodiment of the subject pet tag 4 releasably attached to a pet collar D-ring 5 via overlapping attachment arms 6 and 7.

Placement of the attachment ring within the tag body orients the exposed ring sections parallel to the tag body's flat marking surfaces as illustrated in FIG. 2, causing the front of the identification tag and associated information to come to rest in a more desirable forward-facing position on the animal.

Figure 1:
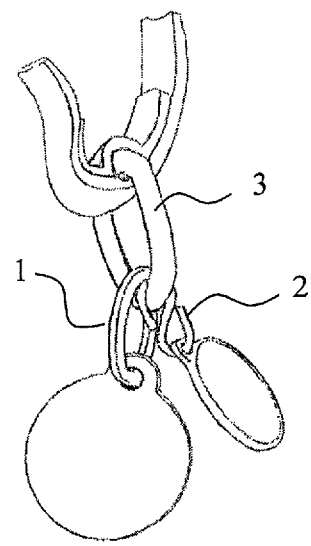
FIG. 1 shows a prior art arrangement of a metal split ring 1 and S-hook 2 attachment devices connecting pet identification tags to the D-ring 3 of a pet collar.

The direct attachment function of the inventive pet tag illustrated in FIG. 2 can shorten the distance between the tag body and pet collar, as separate intermediate coupling devices such as the FIG. 1. Prior Art split ring 1 or S-hook 2 are no longer required to mount the pet tag to the pet collar D-ring 3. The typical distance reduction is approximately one sixteenth inch to one half inch depending on the size of the split ring or S-hook device used for the comparison.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A pet identification tag that is adapted to be releasably coupled directly to a pet collar attachment loop, comprising:
   a tag body; and
   an attachment ring partially permanently anchored in the tag body such that the attachment ring is not removeable from the tag body, the attachment ring having two ring endpoints external to the tag body and that partially overlap one another along lengths thereof to form a fully enclosed coupling area immediately adjacent to the tag body, where the ring endpoints are configured to be spread apart laterally to accommodate insertion of the pet collar attachment loop between them and along their overlapping lengths to either couple or decouple the pet collar attachment loop.

2. The pet identification tag of claim 1, wherein the coupling area is generally circular.

3. The pet identification tag of claim 1, wherein the coupling area has two ends and is bounded on the two ends by first and second arc-shaped structures.

4. The pet identification tag of claim 3, wherein the first arc-shaped structure comprises the ring endpoints and the second arc-shaped structure comprises a perimeter of the tag body.

5. The pet identification tag of claim 1, wherein the ring endpoints comprise overlapping arms.

6. The pet identification tag of claim 1, wherein the ring endpoints are curved along lengths thereof.

7. The pet identification tag of claim 1, wherein the ring endpoints are made from a spring material, such that they can be spread apart from one another from their rest positions and will return to their rest positions.

8. The pet identification tag of claim 1, wherein the attachment ring is a one-piece unitary structure.

9. The pet identification tag of claim 8, wherein the attachment ring is oblong-shaped.

10. The pet identification tag of claim 9, wherein the attachment ring comprises two overlapping curved arms that are external to the body and with spaced ends.

11. The pet identification tag of claim 10, wherein the arms are configured such that one arm end can be moved away from the other arm to create a space into which the pet collar attachment loop can be inserted.

12. The pet identification tag of claim 11, wherein the arms are further configured such that the pet collar attachment loop can be moved along the space until it enters the coupling area.

13. The pet identification tag of claim 1, wherein the attachment ring comprises separate ring portions, each ring portion comprising a curved arm that is external to the tag body, wherein the arms partially overlap.

14. The pet identification tag of claim 13, wherein each ring portion further comprises an integral component that is permanently anchored in the tag body.

15. A pet identification tag that is adapted to be releasably coupled directly to a pet collar attachment loop, comprising:
   a tag body; and
   an attachment ring partially encased in the tag body, the attachment ring having two overlapping arms that are curved along lengths thereof and are external to the tag body and that partially overlap one another to form a fully enclosed coupling area immediately adjacent to the tag body, where the arms are made from a spring material and are configured to be spread apart laterally from their rest positions to accommodate insertion of the pet collar attachment loop between them and along their overlapping lengths, and wherein the arms are further configured to return to their rest positions when the pet collar attachment loop is no longer between them;
   wherein the coupling area is generally circular and has two ends and is bounded on the two ends by first and second arc-shaped structures, wherein the first arc-shaped structure comprises the overlapping arms and the second arc-shaped structure comprises a perimeter of the tag body.

16. The pet identification tag of claim 15, wherein the attachment ring is a one-piece unitary structure.

17. The pet identification tag of claim 16, wherein the attachment ring is oblong-shaped.

18. A pet identification tag that is adapted to be releasably coupled directly to a pet collar attachment loop, comprising:
   a tag body; and
   an attachment ring partially encased in the tag body, the attachment ring having two ring endpoints external to the tag body and that partially overlap one another along lengths thereof to form a fully enclosed coupling area immediately adjacent to the tag body, where the ring endpoints are configured to be spread apart laterally to accommodate insertion of the pet collar attachment loop between them and along their overlapping lengths to either couple or decouple the pet collar attachment loop;
   wherein the coupling area has two ends and is bounded on the two ends by first and second arc-shaped structures, and wherein the first arc-shaped structure comprises the ring endpoints and the second arc-shaped structure comprises a perimeter of the tag body.

* * * * *